(12) United States Patent
Yamaguchi et al.

(10) Patent No.: US 9,321,379 B2
(45) Date of Patent: Apr. 26, 2016

(54) FIBER-REINFORCED RESIN STRUCTURE

(71) Applicant: Toray Industries, Inc., Tokyo (JP)

(72) Inventors: Koji Yamaguchi, Tokyo (JP); Nobuhiko Shimizu, Nagano (JP); Yukitane Kimoto, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/356,918

(22) PCT Filed: Dec. 14, 2012

(86) PCT No.: PCT/JP2012/082486
§ 371 (c)(1),
(2) Date: May 8, 2014

(87) PCT Pub. No.: WO2013/089227
PCT Pub. Date: Jun. 20, 2013

(65) Prior Publication Data
US 2014/0252837 A1    Sep. 11, 2014

(30) Foreign Application Priority Data

Dec. 16, 2011 (JP) ................. 2011-275796

(51) Int. Cl.
*A47C 7/02* (2006.01)
*B60N 2/42* (2006.01)
*B60N 2/427* (2006.01)
*B60N 2/22* (2006.01)
*B29C 70/06* (2006.01)
*B60N 2/66* (2006.01)
(Continued)

(52) U.S. Cl.
CPC .............. *B60N 2/4214* (2013.01); *B29C 70/06* (2013.01); *B60N 2/22* (2013.01); *B60N 2/4228* (2013.01); *B60N 2/42709* (2013.01); *B60N 2/682* (2013.01); *B60N 2/686* (2013.01); *B29C 70/86* (2013.01); *B60N 2/663* (2015.04); *B60N 2/68* (2013.01); *Y10T 403/11* (2015.01); *Y10T 428/1369* (2015.01)

(58) Field of Classification Search
CPC .......... B60N 2/686; B60N 2/68; B60N 2/682; B60N 2/663; B29C 70/86; Y10T 428/1369
USPC ............ 297/216.13, 216.18, 216.16, 216.14, 297/452.18, 284.1, 284.11, 452.2, 451.9, 297/463.2
See application file for complete search history.

(56) References Cited

U.S. PATENT DOCUMENTS 3,674,307 A * 7/1972 Dove ..................... 297/284.7
5,152,578 A * 10/1992 Kiguchi .................. 297/216.16
(Continued)

FOREIGN PATENT DOCUMENTS

JP      62-289450 A    12/1987
JP      2004-211760 A   7/2004
(Continued)

*Primary Examiner* — Chi Q Nguyen
(74) *Attorney, Agent, or Firm* — DLA Piper LLP (US)

(57) ABSTRACT

A fiber-reinforced resin structure having a hole into which a connector that connects to another member is inserted, wherein a bearing strength at a part of an inside surface of the hole on which a load from the connector acts, represented by a stress at which displacement of the part of the inside surface of the hole starts increasing even without the load acting on the part of the inside surface of the hole from the connector increasing, is less than a breaking strength of a fiber-reinforced resin constituting that part of the structure.

11 Claims, 5 Drawing Sheets

(51) Int. Cl.
    *B29C 70/86*     (2006.01)
    *B60N 2/68*     (2006.01)

(56) References Cited

U.S. PATENT DOCUMENTS

| | | | | |
|---|---|---|---|---|
| 6,059,369 | A * | 5/2000 | Bateson et al. | 297/452.18 |
| 6,074,004 | A * | 6/2000 | Carmichael | 297/216.14 |
| 6,786,544 | B1 * | 9/2004 | Muraishi | 297/216.14 |
| 6,895,324 | B2 * | 5/2005 | Straub | 701/93 |
| 6,921,132 | B2 * | 7/2005 | Fujita et al. | 297/216.13 |
| 7,717,519 | B2 * | 5/2010 | Kismarton et al. | 297/452.18 |
| 8,080,303 | B1 * | 12/2011 | Dehart | 428/116 |
| 8,985,695 | B2 * | 3/2015 | Baumgarten | 297/452.18 |
| 8,985,696 | B2 * | 3/2015 | Yasuda et al. | 297/452.18 |
| 2008/0143157 | A1 * | 6/2008 | Burch | 297/219.1 |
| 2014/0139004 | A1 * | 5/2014 | Matsumoto et al. | 297/452.18 |

FOREIGN PATENT DOCUMENTS

| | | |
|---|---|---|
| JP | 2005-334364 A | 12/2005 |
| JP | 2007-253733 A | 10/2007 |
| JP | 2009-208578 A | 9/2009 |
| JP | 2010-179753 A | 8/2010 |

* cited by examiner

FIBER-REINFORCED RESIN STRUCTURE

TECHNICAL FIELD

This disclosure relates to a fiber-reinforced resin structure and, specifically, to a fiber-reinforced resin structure having a hole into which a connector that connects to another member is inserted, for example, a fiber-reinforced resin structure suitably applied to a component for vehicles, in particular, to a frame structure for a seatback of a seat for vehicles and the like.

BACKGROUND

Recently, a structure composed of a fiber-reinforced resin is used in various fields particularly requiring high strength property and light property in weight. Although a fiber-reinforced resin can exhibit an extremely high strength and stiffness, it causes a local breakage because it causes a brittle fracture against an impact load. In fields where such breakage is not desired, by designing the structure so that an additional mechanism, for example, a member to connect the fiber-reinforced resin structure to another member, can be deformed or broken first, or so that an impact energy can be absorbed by the additional mechanism, breakage of the fiber-reinforced resin structure itself has been prevented. Namely, a mechanism for a safe brake or absorbing impact energy has been provided separately from the fiber-reinforced resin structure.

For example, although not limited to application to a fiber-reinforced resin structure, for a component for vehicles, a structure providing an external mechanism capable of absorbing an impact energy (for example, JP-A-2010-179753), a structure capable of absorbing an impact energy utilizing delamination at an adhesive layer (for example, JP-A-2009-208578) and the like are known.

In such a structure providing an additional mechanism, however, an additional component or an additional assembly step is required and, in particular, an increase in the production cost is caused from the viewpoint of the number of components or the assembly steps.

On the other hand, JP-A-2007-253733 discloses a structure wherein a fastening portion of a component for vehicles formed as a stacked body of fiber-reinforced resin sheet materials is formed so that a fastener bites into an interlayer part of the stacked sheet materials, and an impact load is absorbed by causing the stacked body to be delaminated at the interlayer part.

In the structure disclosed in JP '733, however, since it stands based on occurrence of deformation or breakage in the direction of the interlayer delamination which usually has a high possibility causing a fiber-reinforced resin structure to be most weakened in strength, there is a fear that it becomes difficult to make the fiber-reinforced resin structure exhibit the originally targeted high mechanical properties. Namely, it becomes a structure which sacrifices the originally targeted high mechanical properties.

Accordingly, paying attention to the above-described problems in conventional technologies, it could be helpful to provide a fiber-reinforced resin structure capable of absorbing external loads such as impact energy with extremely high efficiency via deformation or displacement only of a necessary local part without accompanying breakage, without increasing the number of components or assembly steps and while making the originally targeted structure exhibiting high mechanical properties.

SUMMARY

We provide a fiber-reinforced resin structure having a hole into which a connector that connects to another member is inserted, wherein a bearing strength at a part of an inside surface of the hole on which a load from the connector acts, represented by a stress at which displacement of the part of the inside surface of the hole starts increasing even without the load acting on the part of the inside surface of the hole from the connector increasing, is less than a breaking strength of a fiber-reinforced resin constituting that part of the structure.

EXPLANATION OF SYMBOLS

1: frame structure for a seatback as a fiber-reinforced resin structure
2a, 2b: hole
3: seat frame
4: rotation adjusting member
5: sequential fracture part
6: bolt
11: testing device
12: test piece
13: hole
14: pin
15: nipping jig
16: pressing jig
17: trigger (notch)

DETAILED DESCRIPTION

Our fiber-reinforced resin structure has a hole into which a connector that connects to another member is inserted, and is characterized in that a bearing strength at a part of an inside surface of the hole on which a load from the connector acts, represented by a stress at which displacement of the part of the inside surface of the hole starts increasing even without the load acting on the part of the inside surface of the hole from the connector increasing, is less than a breaking strength of a fiber-reinforced resin constituting that part of the structure.

In such a fiber-reinforced resin structure, since the bearing strength at the part of the inside surface of the hole into which the connector is inserted is less than the breaking strength of the fiber-reinforced resin constituting that part, when the load from the connector acts on the part of the inside surface of the hole and the load becomes greater than the above-described bearing strength, displacement of the part of the inside surface of the hole starts increasing without causing breakage of the fiber-reinforced resin constituting that part and a part around that part. Namely, the area of the hole starts increasing and, for example, the original shape of the hole, which has been a circular hole, is deformed to a slot shape extending in the direction acted with the load. In this deformation, for example, by the load acting from the connector, the fiber-reinforced resin part forming the inside surface of the hole exhibits an aspect wherein a local fracture sequentially progresses from the inside surface of the hole toward a part away from the inside surface, and the hole enlarged accompanies the progress of the sequential fracture. Accompanying this deformation, the energy of the load having acted on the inside surface of the hole is consumed by deformation of the hole, and energy due to external load is adequately absorbed. Therefore, without accompanying a local breakage of the fiber-reinforced resin itself, with localized displacement or deformation only around the hole, an external load such as an impact energy can be efficiently absorbed. Because only a specified local part may be deformed or displaced without accompanying a breakage of the fiber-reinforced resin itself, it is not necessary to provide an additional mechanism between it and another member, and it does not cause an increase in the number of components or assembly steps. Further, since interlayer delamination in the fiber-reinforced resin is not utilized for deformation of the shape of the hole and, rather than that, it is possible to strengthen the fiber-reinforced resin present at the part of the inside surface of the hole, originally targeted high mechanical properties due to employment of fiber-reinforced resin can be easily given to the fiber-reinforced resin structure.

In the above-described fiber-reinforced resin structure, as the hole inserted with the above-described connector, a form of a hole, which is not penetrated in the thickness direction of the fiber-reinforced resin structure, can be employed, and a form of a through hole can also be employed. In consideration of a usual connection, frequently a through hole is more preferred from the viewpoint of processing and connecting operation.

Further, formation of the above-described connector is not particularly restricted, and a typical pin or bolt, or the like, may be used. Where a bolt is used, it is preferred that a screw fastening portion for the bolt is provided at another member side, the part of the inside surface of the hole of the fiber-reinforced resin structure is formed to contact an outer circumferential surface of a columnar part of a non-screw part of the bolt, and a load from the outer circumferential surface of the non-screw part acts on the part of the inside surface of the hole. Where a pin is used, as the method of connection with another member side, there are adhesion, welding, rivet fastening, fitting and the like, and welding is preferred because of the least cost. As the welding method, there are gas welding, oxyacetylene welding, arc welding, automatic arc welding, semi-automatic arc welding, TIG welding, plasma welding, shielded metal arc welding, submerged arc welding, MIG welding, $CO_2$ gas shielded arc welding, self-shielded arc welding, electroslag welding, electron beam welding, laser beam welding, resistance welding, lap resistance welding, spot welding, projection welding, seam welding, butt resistance welding, upset welding, flash welding, butt seam welding, friction welding, thermit welding, brazing, soldering and the like. There is also a method of reinforcing a hole to fasten with a collar. The collar may either be directly embedded or may be press-fitted after molding.

Further, with respect to the part of the inside surface of the hole of the above-described fiber-reinforced resin structure, to enhance the breaking strength of the fiber-reinforced resin as much as possible and make the bearing strength at the part of the inside surface of the hole less than the breaking strength of the fiber-reinforced resin constituting that part, a structure can be employed wherein reinforcing fibers of the fiber-reinforced resin at the part of the inside surface of the hole of the above-described structure with the load from the connector are arranged more than those at another part. In this case, it is preferred that the reinforcing fibers at the part of the inside surface of the hole are arranged to extend in a direction along the inner circumferential direction of the hole. By such an arrangement of the reinforcing fibers, because the load acts in a direction perpendicular to the arrangement direction of the reinforcing fibers, without accompanying interlayer delamination of the fiber-reinforced resin, the breaking strength of the fiber-reinforced resin constituting that part can be adequately increased, and it becomes possible to easily set the bearing strength at the part of the inside surface of the hole at a target strength.

Further, to cause a displacement of the part of the inside surface of the hole in a desired direction more easily, a structure can also be employed wherein a trigger becoming a starting point of the displacement of the part of the inside surface of the hole is provided at the part of the inside surface of the hole of the structure acted with the load from the connector. By providing the trigger at an adequate form and at an adequate part, a desirable displacement of the part of the inside surface of the hole can be started surely, and even after the starting, the desirable displacement can be continued.

It is possible to form such a trigger with a notch formed on the part of the inside surface of the hole. Since the trigger may become a starting point of the displacement of the part of the inside surface of the hole, one excessively large in shape is not necessary. If the shape of the trigger is too large, there is a fear that the strength of the fiber-reinforced resin at that part may be decreased.

Further, to enhance the strength of the fiber-reinforced resin and relatively reduce the bearing strength at the part of the inside surface of the hole, a structure can also be employed wherein continuous reinforcing fibers are disposed at a part around the hole. Although the part to be disposed with the continuous reinforcing fibers is not particularly restricted as long as it is a part around the hole, in particular, where the trigger is provided as described above, a structure is preferred wherein the continuous reinforcing fibers are disposed at a part around the hole except a part provided with the trigger. It is possible to easily dispose such continuous reinforcing fibers as long as the part to be disposed is a part around the structure having a hole.

Further, as the above-described continuous reinforcing fibers, it is also possible to use reinforcing fibers different in kind from the reinforcing fibers used for the fiber-reinforced resin forming the above-described part around the hole. By using such different kind of reinforcing fibers, it becomes possible to efficiently enhance the mutual strength of that part.

Further, although the kind of reinforcing fibers of the fiber-reinforced resin constituting the above-described structure is not particularly restricted, in consideration of maintaining the mechanical properties of the fiber-reinforced resin to be high and setting the bearing strength precisely at a desired value, it is preferred that the carbon fibers are high in strength and stiffness and can be easily designed. Of course, other reinforcing fibers such as glass fibers or aramid fibers can be used, and a hybrid structure of carbon fibers and other reinforcing fibers can also be employed. The matrix resin of the fiber-reinforced resin constituting the above-described structure is not particularly restricted, and any of a thermoplastic resin, a thermosetting resin and a combination thereof can be used.

Such a fiber-reinforced resin structure can be applied to any fiber-reinforced resin structure having a hole into which a connector connecting to another member is inserted. For example, exemplified are housings, inner members such as tray and chassis and casings thereof of electric/electronic equipment such as personal computer, display, office automation equipment, portable telephone, portable information terminal, facsimile, compact disc, portable micro disc, portable radio cassette, PDA (portable information terminal such as electronic pocketbook), video camera, digital still camera, optical equipment, audio equipment, air conditioner, illumination equipment, amusement goods, playthings, and other electric household appliances; members for mechanisms; building material such as panel; parts, members and outer panels for two-wheeled vehicles; parts, members and outer panels for airplanes such as landing gear pod, winglet, spoiler, edge, rudder, elevator, fairing, and rib and the like. In particular, as parts for vehicles, it can be applied to motor parts, alternator terminal, alternator connector, IC regulator, potentiometer base for light dimmer, parts for suspension, various kinds of valves such as exhaust gas valve, various kinds of pipes for fuel, exhaust and intake systems, air intake nozzle snorkel, intake manifold, various kinds of arms, various kinds of frames, various kinds of hinges, various kinds of bearings, fuel pump, gasoline tank, CNG tank, engine cooling water joint, carburetor main body, carburetor spacer, exhaust gas sensor, cooling water sensor, oil temperature sensor, brake friction pad wear sensor, throttle position sensor, crank shaft position sensor, air flow meter, thermostat base for air conditioner, heater hot air flow control valve, brush holder for radiator motor, water pump impeller, turbine vane, parts for wiper motor, distributor, starter switch, starter relay, wire harness for transmission, window washer nozzle, air conditioner panel switch board, fuel system electromagnetic valve coil, connector for fuse, battery tray, AT bracket, head lamp support, pedal housing, handle, door beam, protector, chassis, frame, parts for absorbing energy, members, arm rest, horn terminal, step motor rotor, lamp socket, lamp reflector, lamp housing, brake piston, noise shield, radiator support, spare tire cover, sheet shell, solenoid bobbin, engine oil filter, ignition device case, under cover, scuff plate, pillar trim, propeller shaft, wheel, fender, facer, bumper, bumper beam, bonnet, aero parts, platform, cowl louver, roof, instrument panel, spoiler, various kinds of modules and the like, especially it can be applied to parts for vehicles for which a stable fracture is required, and among those, as shown in the example described later, it is effective as a frame structure for a seatback of a seat for vehicles.

Where the fiber-reinforced resin structure is applied as a frame structure for a seatback of a seat for vehicles, for example, a structure can be employed wherein at least two holes inserted with connectors connecting to another member are provided at a lower part of the frame structure for the seatback, and at least one hole of the at least two holes is the above-described hole having the part of the inside surface with the bearing strength less than the breaking strength of the fiber-reinforced resin. In particular, where one of the two holes can function as a fulcrum for rotation of the frame structure for the seatback, the other hole applied with a moment load may be formed as a hole having the part of the inside surface with the bearing strength less than the breaking strength of the fiber-reinforced resin.

Thus, in the fiber-reinforced resin structure, without causing an increase in the number of components or assembly steps and while making the fiber-reinforced resin structure exhibiting the originally targeted high mechanical properties, only deformation or displacement around the hole can be caused at desired conditions without accompanying breakage when a great external load is applied to the structure, thereby making it possible to absorb external loads such as impact energy with extremely high efficiency.

Hereinafter, examples of our structures and methods will be explained.

Figure 1:
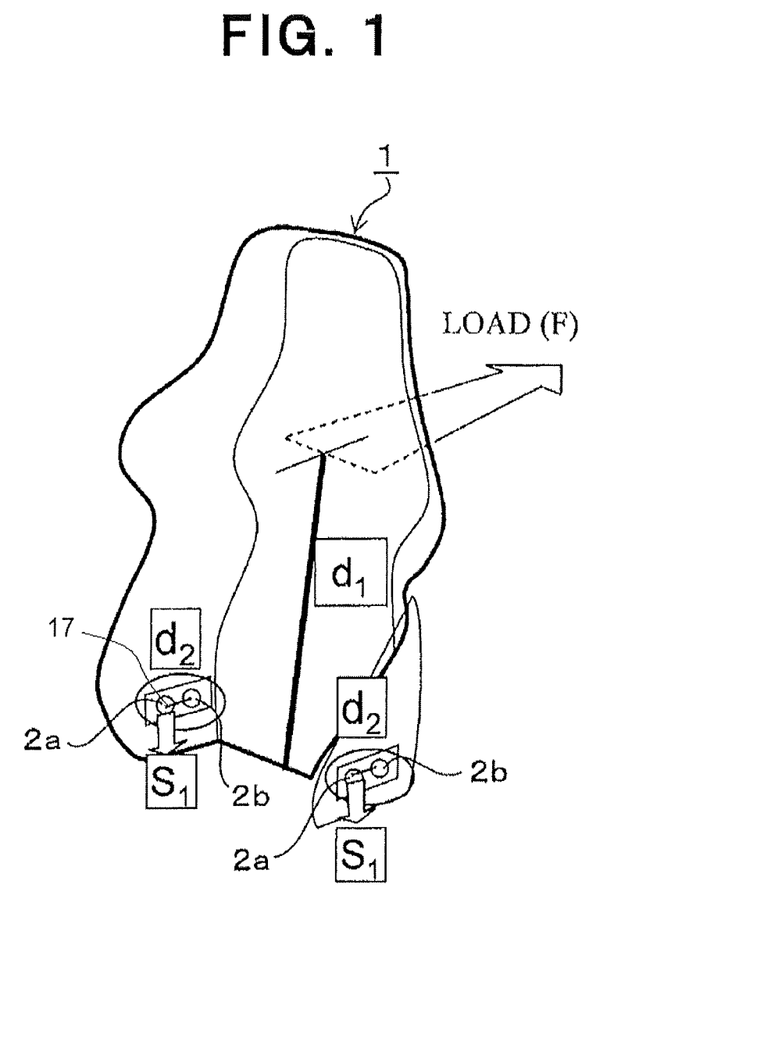
FIG. 1 is a schematic perspective view of a frame structure for a seatback according to an example of a fiber-reinforced resin structure.
Figure 2:
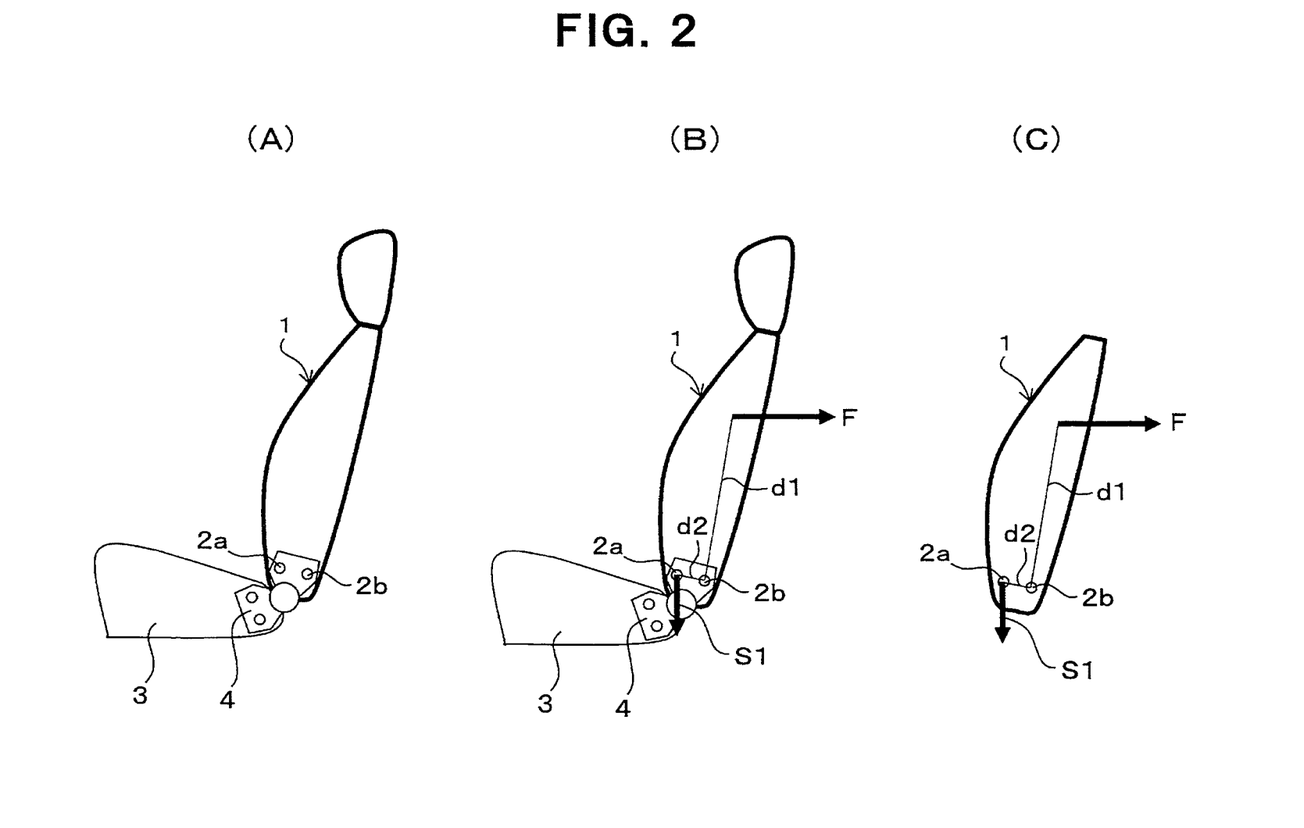
FIG. 2 shows (A) a schematic side view of the frame structure for the seatback depicted in FIG. 1, (B) a schematic side view in case where a load is applied to the frame structure for the seatback, and (C) a schematic side view indicating only the part of the frame structure for the seatback at the condition shown in (B).

FIGS. 1 and 2 show an example and, in particular, show a fiber-reinforced resin structure formed as a frame structure for a seatback of a seat for vehicles. In FIGS. 1 and 2, symbol 1 indicates a frame structure for a seatback of a seat for vehicles as an example of the fiber-reinforced resin structure. Frame structure for a seatback 1 is formed as an integrally molded body of a fiber-reinforced resin structure using carbon fibers as the reinforcing fibers. On each side of the lower part of frame structure for a seatback 1, two holes 2a, 2b arranged approximately in a horizontal direction, into which connectors (for example, bolts) that connect to another member, for example, rotation adjusting members 4 forming a part of a seat frame 3, are inserted, are provided. In this example, as shown in the figures, for example, when an impact load (F) applied to the upper part of the frame structure for a seatback 1 toward the vehicle rear direction at the time of collision of the vehicle is exemplified, hole 2b functions as a fulcrum for rotation when the load (F) is applied, and a load from a bolt as the connector is applied to the inside surface of hole 2a. Namely, a moment whose arm length is d1 is caused around hole 2b by the load (F), as counteracted thereto, a moment whose arm length is d2 that is a distance between the centers of holes 2a, 2b is caused in an opposite direction, and accompanying therewith, a downward load S1 is applied onto the inside surface of hole 2a.

Figure 3:
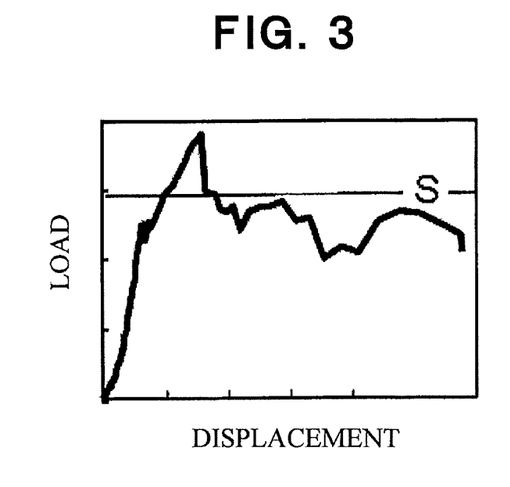
FIG. 3 is a diagram showing an example of a relationship between a load applied to a fiber-reinforced resin and a displacement of a part of an inside surface of a hole of the fiber-reinforced resin applied with the load.

Then, the bearing strength S on the part of the inside surface of hole 2a, represented by a stress when the displacement of the part of the inside surface of hole 2a starts to increase even if the load S1 from the bolt acting on the part of the inside surface of hole 2a does not increase, is set to be less than the breaking strength of the fiber-reinforced resin constituting that part of the frame structure 1 for the seatback. Namely, as the relationship between the load applied to the fiber-reinforced resin and the displacement of the part of the inside surface of the hole of the fiber-reinforced resin applied with the load is exemplified in FIG. 3, the load, which causes displacement of the part of the inside surface of hole 2a to continuously increase even if the load acting on the part of the inside surface of hole 2a does not increase, (more accurately, the stress at that time), is defined as the bearing strength S, and the bearing strength S is set to become less than the breaking strength of the fiber-reinforced resin as the material forming the part of the inside surface of hole 2a and the part therearound.

Figure 4:
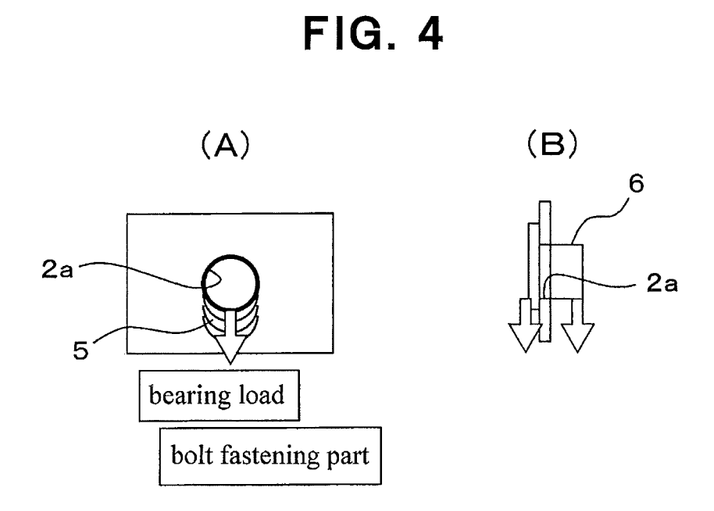
FIG. 4 shows (A) a schematic elevational view of a hole showing an example of a local sequential fracture of a part around the hole and (B) a schematic side view thereof.

Since the bearing strength S of the part of the inside surface of hole 2a is less than the breaking strength of the fiber-reinforced resin, when an impact load or the like is applied, at the part around hole 2a the fiber-reinforced resin as the structural material does not reach breaking by being torn off and, for example, as shown in FIG. 4, a sequential fracture is locally caused (a sequential fracture part 5) at the part around hole 2a toward the direction of the inside surface of hole 2a applied with the load from bolt 6 as the connector (a direction applied with bearing stress), and the hole 2a is being sequentially enlarged and deformed to a slot. The energy of the load having been applied is consumed and absorbed at the step of this local sequential fracture. Therefore, without accompanying the breakage of the fiber-reinforced resin itself constituting the frame structure for a seatback 1, the impact energy is efficiently absorbed by local deformation of the part around hole 2a.

Since only a desired local deformation may be caused at the part around hole 2a, another member and another mechanism are unnecessary, and basically the number of components or assembly steps is not increased. Further, because it is not necessary at all to set the breaking strength of the fiber-reinforced resin to be low, high mechanical properties to be originally targeted can be given to the fiber-reinforced resin structure. Namely, while making the fiber-reinforced resin structure exhibit desired high mechanical properties, external loads such as an impact energy can be adequately absorbed by the fiber-reinforced resin structure itself (in particular, by designing the fiber-reinforced resin structure itself to a specified structure).

With respect to design of the part around hole 2a, as aforementioned, a structure wherein the reinforcing fibers of the fiber-reinforced resin are arranged more than those of another part, or a structure wherein a trigger 17 (for example, a notch) becoming a starting point of the displacement of the part of the inside surface of hole 2a is appropriately provided, can be employed.

Figure 5:
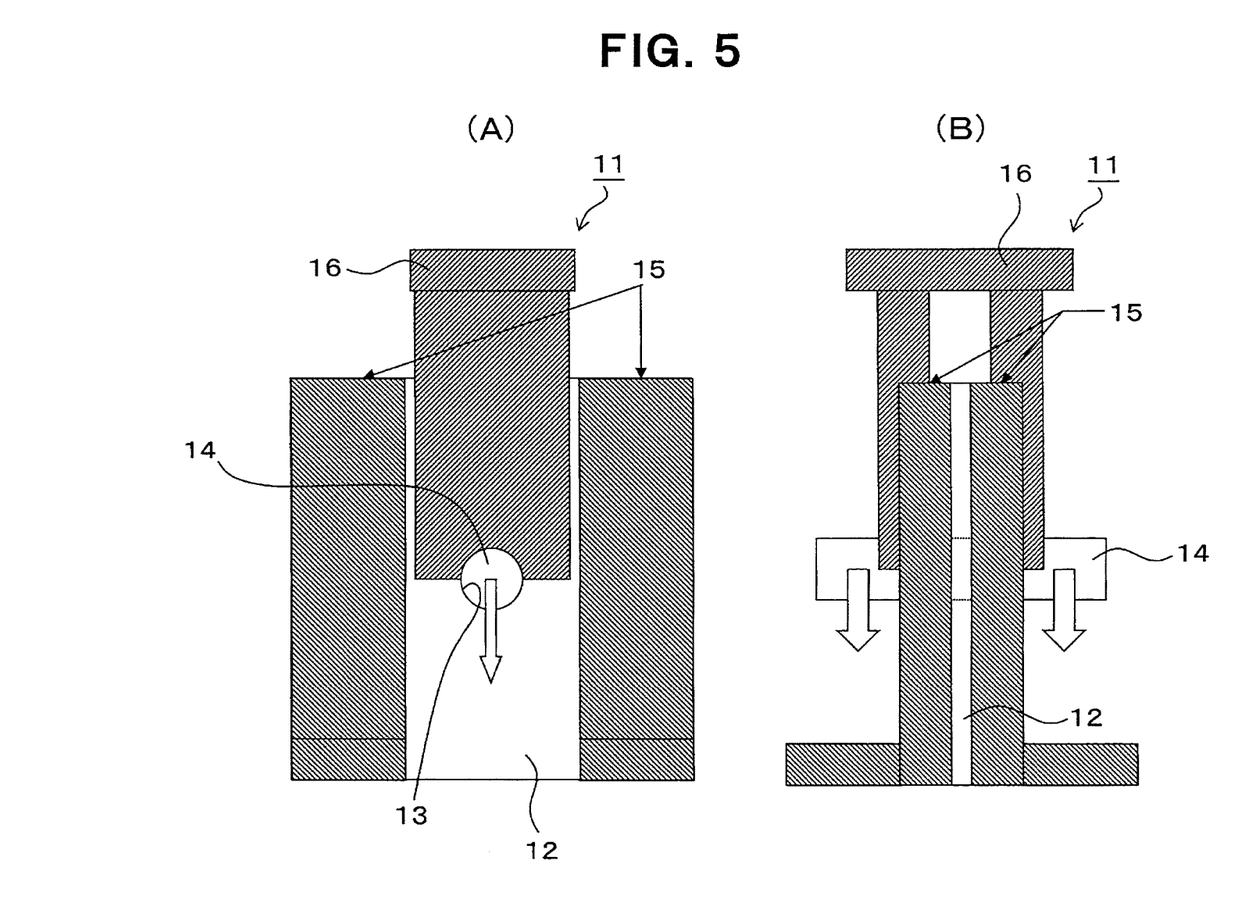
FIG. 5 shows (A) an elevational view of a testing device showing an example of a method for measuring a bearing strength and (B) a side view thereof.

The bearing strength at the part of the inside surface of the hole of the fiber-reinforced resin structure, into which the connector connecting to another member is inserted, for example, can be measured by a testing device as shown in FIG. 5. In a testing device 11 shown in FIG. 5, into a hole 13 of a plate-like test piece 12, a pin 14 having an outer diameter (for example, outer diameter: 10 mm) approximately equal to or slightly smaller than the inner diameter of the hole 13 (for example, inner diameter: 10.5 mm) is inserted at a condition of being penetrated. Test piece 12 is nipped from both surface sides by a nipping jig 15, a load is applied to the upper surface of pin 14 by a pressing jig 16 uniformly at two parts of the pin 14 positioned on the both surface sides of the test piece 12 (for example, the load is applied using an Instron testing machine), and by displacing the pin 14 in the arrow direction, the bearing strength of the part of the inside surface of the hole 13 (the part of the lower surface side thereof) can be determined.

Figure 6:
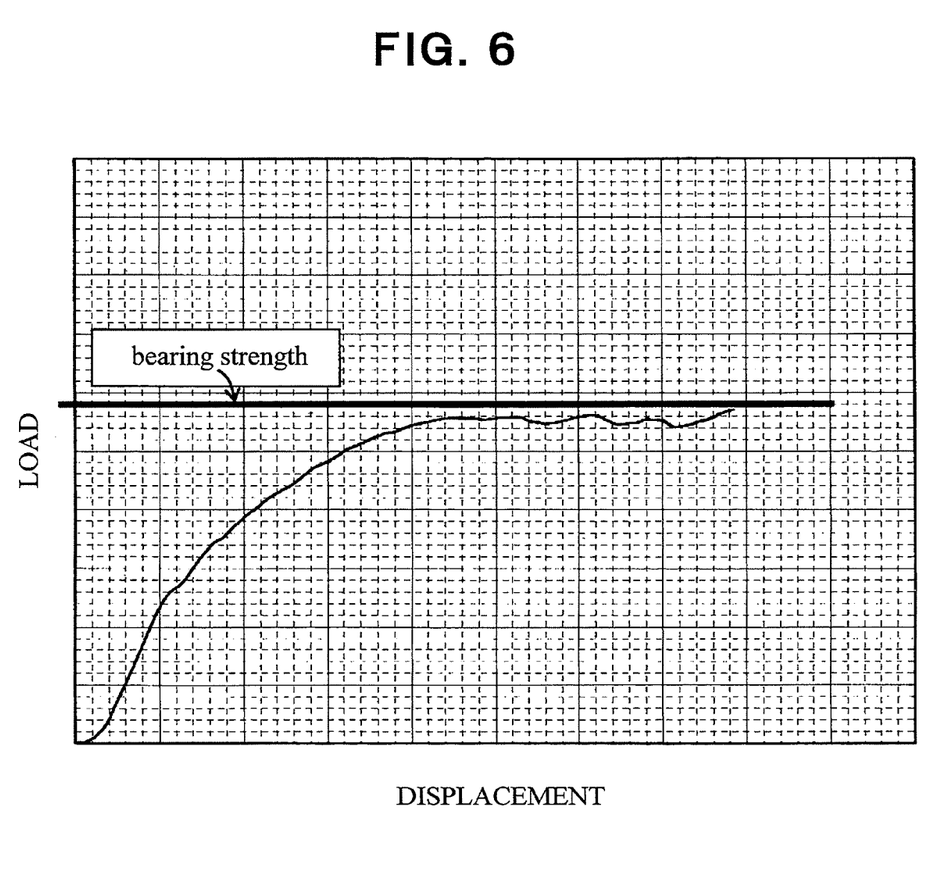
FIG. 6 is a load-displacement diagram of a test piece showing an example of a bearing strength measured by the testing device depicted in FIG. 5.

When the load is applied to pin 14 as described above, the part of the inside surface of hole 13 (the part of the lower surface side thereof) is locally displaced (that is, the hole 13 is being deformed to a slot-like shape), the displacement is measured as a displacement of the pin 14, and a load-displacement diagram can be obtained, for example, as shown in FIG. 6. In this load-displacement diagram, the stress at which the displacement starts increasing even without the load increasing is determined as the bearing strength. Using the bearing strength thus determined, the fiber-reinforced resin structure can be designed.

INDUSTRIAL APPLICATIONS

The fiber-reinforced resin structure can be applied to any fiber-reinforced resin structure having a hole into which a connector connecting to another member is inserted and, in particular, it is suitable as a component for vehicles, especially suitable as a frame structure for a seatback of a seat for vehicles.

The invention claimed is:

1. A fiber-reinforced resin structure of a vehicle seat frame having a hole into which a connector that connects to another member is inserted, wherein a bearing strength at a part of an inside surface of said hole on which a load from said connector acts, represented by a stress at which displacement of said part of said inside surface of said hole starts increasing even without said load acting on said part of said inside surface of said hole from said connector increasing, is less than a breaking strength of a fiber-reinforced resin constituting that part of said structure; and reinforcing fibers of said fiber-reinforced resin at said part of said inside surface of said hole of said structure acted with said load from said connector are arranged more than those at another part.

2. The fiber-reinforced resin structure according to claim 1, wherein said hole inserted with said connector is a through hole.

3. The fiber-reinforced resin structure according to claim 1, wherein said connector comprises a pin or a bolt.

4. The fiber-reinforced resin structure according to claim 1, wherein a trigger becoming a starting point of said displacement of said part of said inside surface of said hole is provided at said part of said inside surface of said hole of said structure acted with said load from said connector.

5. The fiber-reinforced resin structure according to claim 4, wherein said trigger comprises a notch formed on said part of said inside surface of said hole.

6. The fiber-reinforced resin structure according to claim 4, wherein continuous reinforcing fibers are disposed at a part around said hole except a part provided with said trigger.

7. The fiber-reinforced resin structure according to claim 6, wherein reinforcing fibers different in kind from reinforcing fibers used for a fiber-reinforced resin forming said part around said hole are used as said continuous reinforcing fibers.

8. The fiber-reinforced resin structure according to claim 1, wherein a fiber-reinforced resin constituting said structure contains carbon fibers.

9. The fiber-reinforced resin structure according to claim 1, wherein said structure forms a component for vehicles.

10. The fiber-reinforced resin structure according to claim 9, wherein said structure comprises a frame structure for a seatback of a seat for vehicles.

11. The fiber-reinforced resin structure according to claim 10, wherein at least two holes inserted with connectors connecting to another member are provided at a lower part of said frame structure for a seatback, and at least one of the holes is said hole having said part of said inside surface with said bearing strength less than said breaking strength of said fiber-reinforced resin.

* * * * *